(12) United States Patent
Igarashi et al.

(10) Patent No.: US 8,051,661 B2
(45) Date of Patent: Nov. 8, 2011

(54) SUPERCHARGING CONTROL SYSTEM OF AN INTERNAL COMBUSTION ENGINE

(75) Inventors: Osamu Igarashi, Susono (JP); Masakazu Tabata, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 414 days.

(21) Appl. No.: 12/446,255

(22) PCT Filed: Dec. 12, 2007

(86) PCT No.: PCT/JP2007/073923
§ 371 (c)(1),
(2), (4) Date: Apr. 20, 2009

(87) PCT Pub. No.: WO2008/075593
PCT Pub. Date: Jun. 26, 2008

(65) Prior Publication Data
US 2010/0326407 A1  Dec. 30, 2010

(30) Foreign Application Priority Data
Dec. 19, 2006  (JP) .................................. 2006-341587

(51) Int. Cl.
*F02B 33/44*  (2006.01)
(52) U.S. Cl. .......................................... 60/608; 60/612
(58) Field of Classification Search .................... 60/597, 60/607–609; 123/564–565; 290/52
See application file for complete search history.

(56) References Cited

U.S. PATENT DOCUMENTS

| | | | | |
|---|---|---|---|---|
| 6,883,324 B2* | 4/2005 | Igarashi et al. | ................. | 60/608 |
| 6,907,867 B2* | 6/2005 | Igarashi et al. | ................ | 123/565 |
| 6,922,995 B2* | 8/2005 | Kawamura et al. | ............. | 60/608 |
| 6,938,420 B2* | 9/2005 | Kawamura et al. | ............. | 60/612 |
| 7,043,916 B2* | 5/2006 | Masuda | .......................... | 60/608 |
| 7,434,399 B2* | 10/2008 | Ishiwatari | ....................... | 60/608 |
| 7,478,533 B2* | 1/2009 | Ueno | .............................. | 60/608 |
| 7,530,229 B2* | 5/2009 | Akita | .............................. | 60/608 |
| 7,673,452 B2* | 3/2010 | Shimizu | .......................... | 60/608 |
| 7,762,068 B2* | 7/2010 | Tabata et al. | .................... | 60/608 |

FOREIGN PATENT DOCUMENTS

| | | |
|---|---|---|
| JP | 4 255529 | 9/1992 |
| JP | 5 280363 | 10/1993 |
| JP | 5 280365 | 10/1993 |
| JP | 2003 239755 | 8/2003 |
| JP | 2006 57548 | 3/2006 |

* cited by examiner

*Primary Examiner* — Thanh Lam
(74) *Attorney, Agent, or Firm* — Oblon, Spivak, McClelland, Maier & Neustadt, L.L.P.

(57) ABSTRACT

The purpose of the present invention is providing a supercharging system which uses both of a mechanism such as VN or the like and an electric motor generating an assist force while making the supercharger operate smoothly when the assist by the electric motor is stopped. The system controls the electric motor in a feedback manner so that enough assist force is generated (FIG. 2A and FIG. 2B) while controlling the VN in an open manner (FIG. 2D) until status of the supercharger reaches target status (time t1) when an accelerator requirement arises in a low revolution region. The control of the electric motor is changed to an open control, and the control of the VN is changed to a feedback control, respectively, at time t1. The open control of the electric motor is continued so that necessary complement torque occurs until time t2. After time t2, the system maintains the target status only by the feedback control of the VN.

14 Claims, 7 Drawing Sheets

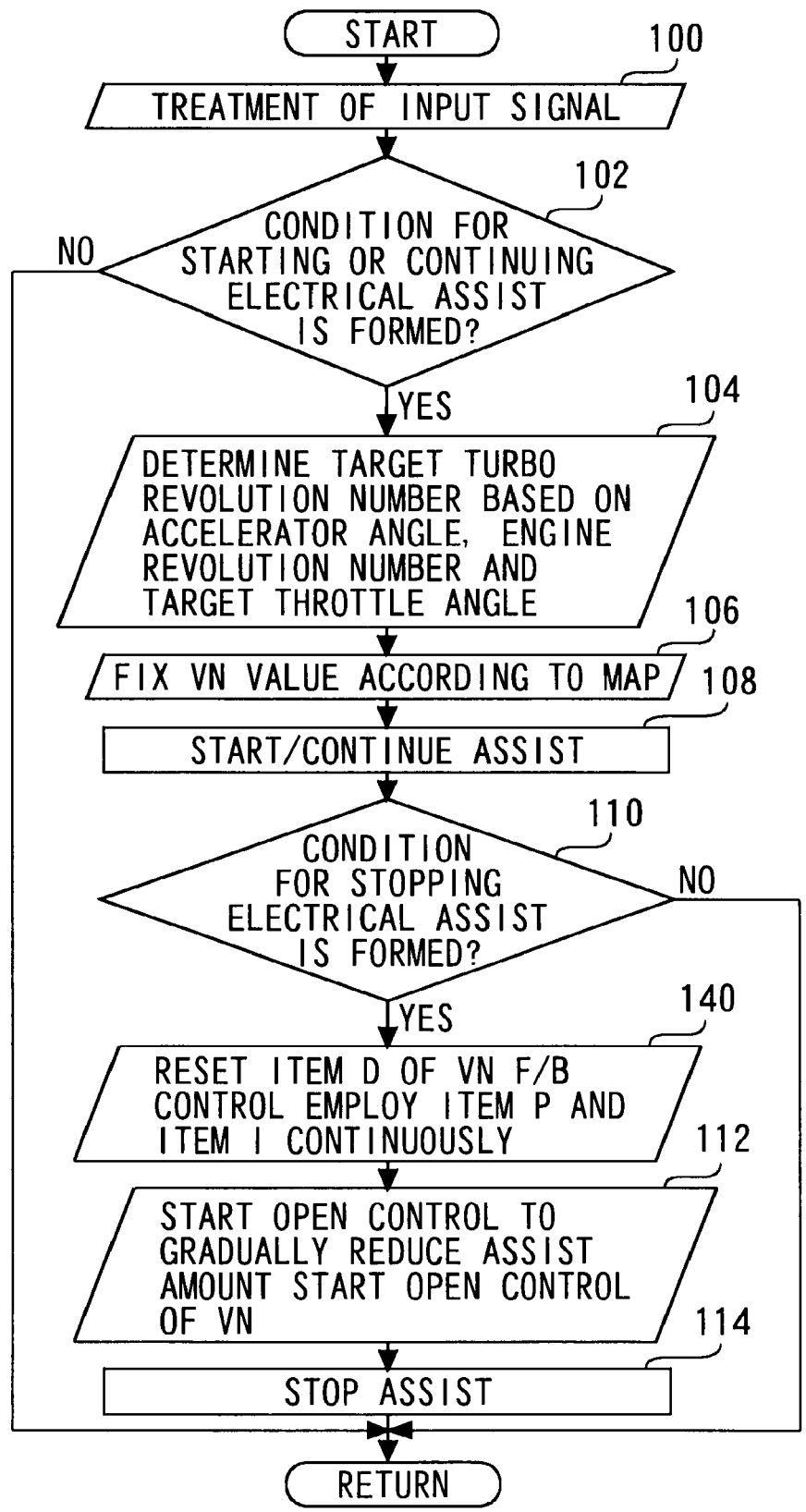

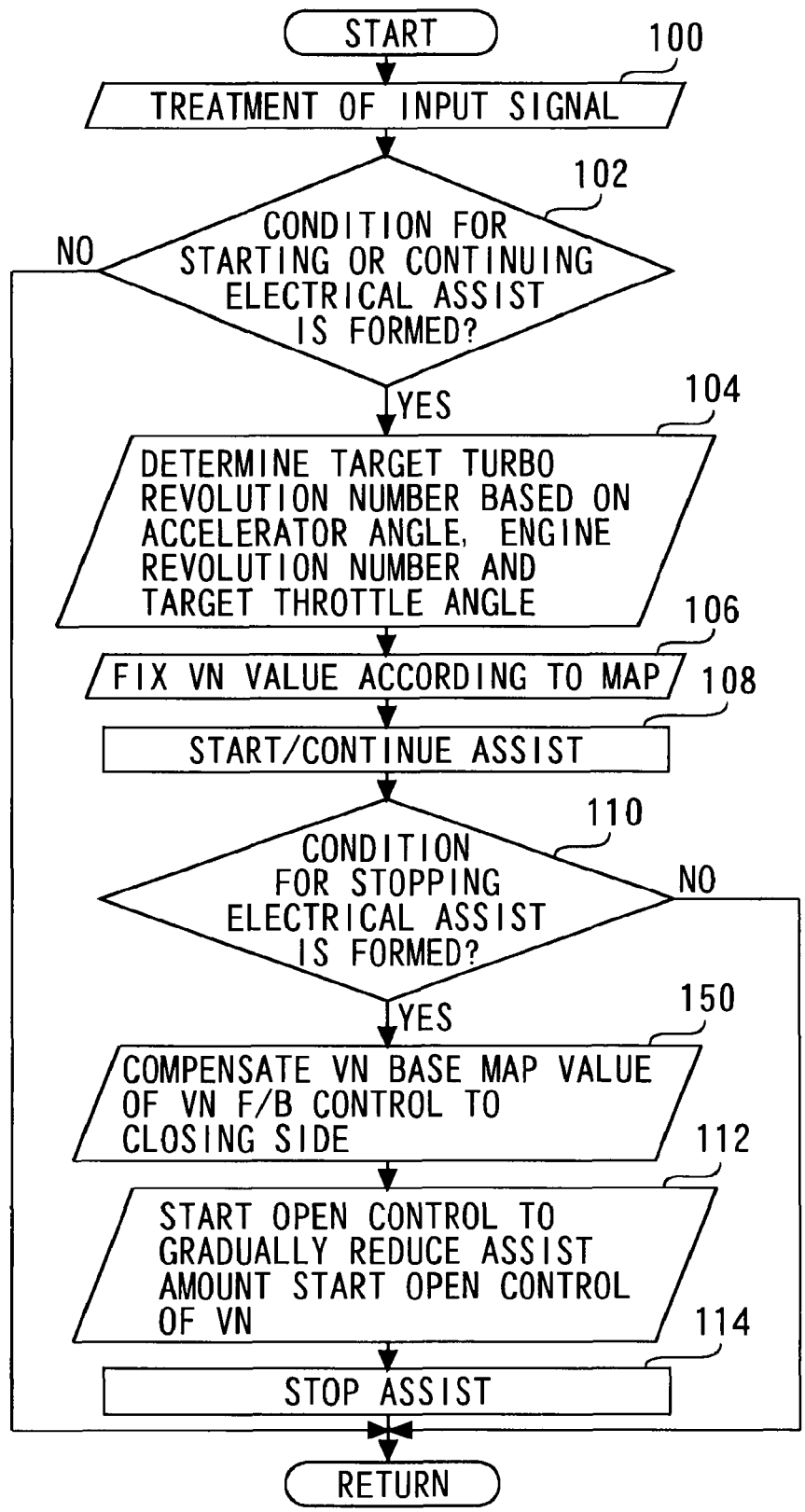

SUPERCHARGING CONTROL SYSTEM OF AN INTERNAL COMBUSTION ENGINE

TECHNICAL FIELD

The present invention relates to a supercharging control system of an internal combustion engine, and more particularly to a supercharging control system which has electric assist facility so as to be preferable as a system for controlling a supercharging condition of an internal combustion engine for vehicle use.

BACKGROUND ART

Super charger (turbocharger) of an internal combustion engine which has electric assist facility is known as disclosed by Japanese Patent Laid-Open No. 2003-239755, conventionally. The above mentioned prior supercharger further has a movable nozzle (VN) for changing flow velocity of exhaust gas which flows through a turbine.

As for an internal combustion engine comprising a turbocharger, a problem of so-called turbo lag occurs in a low revolution region. According to the above mentioned prior supercharger, it is possible to restrain the turbo lag from occurring by assisting the revolution of the supercharger by the electric motor in a low revolution region. According to this supercharger, the occurring of the turbo lag can be also restrained by closing the VN in a low revolution region.

More particularly, the above mentioned prior system equipped with the supercharger implements the supercharging by controlling the VN in a feedback manner while using the assist by the electric motor during a period in which a true boost pressure is low enough for a target boost pressure under a condition in which an acceleration of the internal combustion engine is required. Afterwards, when the true boost pressure gets closer to the target boost pressure, the assist by the electric motor is stopped so as to implement the target boost pressure only by the feedback control of the VN. According to such operation, the turbo lag can be controlled effectively while restraining the electric consumption by the electric motor.

Patent Document 1: Japanese Patent Laid-open No. 2003-239755
Patent Document 2: Japanese Patent Laid-open Hei5-280365
Patent Document 3: Japanese Patent Laid-open Hei5-280363

DISCLOSURE OF INVENTION

Problem to be Solved by the Invention

In the above mentioned prior system, however, the situation in which the assist force by the electric motor becomes extinct suddenly at the time point when the true boost pressure gets closer to the target boost pressure. If the assist power by the electric motor becomes extinct suddenly, the revolution speed of the supercharger would drop temporarily; this results in an excessive feedback control of the VN for cancelling the drop. Because of this, drop of the boost pressure as well as hunting in the VN opening are apt to arise immediately after the termination of the assist by the electric motor.

The present invention is achieved for solving the above mentioned problem, and the purpose of the invention is providing a supercharger control system of an internal combustion engine which uses both of an electric motor that produces assist force and a mechanism such as VN that changes a ratio of exhaust energy converted into the supercharger revolution, and can keep the operation of the supercharger to be smooth when the assist by the electric motor is terminated.

Means for Solving the Problem

To achieve the above mentioned purpose, the first aspect of the present invention is a supercharging control system of an internal combustion engine comprising:

a supercharger supercharging intake air using exhaust energy of the internal combustion engine;

an electric motor assisting the revolution of the supercharger;

a drive ratio variable mechanism changing a ratio of exhaust energy converted into the revolution of the supercharger;

assist control means that controls said electric motor for the purpose of realizing a target supercharging status, while controlling said drive ratio variable mechanism with a predetermined pattern until a switching time point when a status value of said supercharger increases up to a target value corresponding to said target supercharging status or vicinity thereof;

complement control means that controls said electric motor for the purpose of generating a necessary complement torque to implement said target supercharging status or holding the revolution of said supercharger while controlling said drive ratio variable mechanism for the purpose of implementing said target supercharging status during a predetermined period after said switching time point; and non-assist control means that controls said drive ratio variable mechanism for the purpose of realizing said target supercharging status while stopping power supply to said electric motor after a time point when the exhaust energy reaches a value by which said target supercharging status can be implemented without the assist of said electric motor.

The second aspect of the present invention is the supercharging control system according to the first aspect of the present invention, comprising status value detecting means for detecting said status value, wherein said assist control means includes means for controlling said electric motor in a feedback manner so that said status value agrees with said target value;

said complement control means includes means for controlling said drive ratio variable mechanism in a feedback manner so that said status value agrees with said target value, as well as means for controlling said electric motor with a pattern predetermined as one for generating said complement torque; and said non-assist control means includes means for controlling said drive ratio variable mechanism in a feedback manner so that said status value agrees with said target value.

The third aspect of the present invention is the supercharging control system of the internal combustion engine according to the first or the second aspect of the present invention, wherein said complement control means includes means for reducing a command supplied to said electric motor with a predetermined pattern so that the assist force generated by the electric motor becomes zero at the end time point of said predetermined period.

The fourth aspect of the present invention is the supercharging control system of the internal combustion engine according to any one of the first to the third aspects of the present invention, comprising:

at least one of gas quantity detecting means for detecting a gas quantity flowing through the internal combustion engine and boost pressure climbing speed detecting means for detecting a climbing speed of the boost pressure generated by said supercharger; and assist variables setting means for setting at least one of said switching time point and said predetermined period based on at least one of said gas quantity and said climbing speed.

The fifth aspect of the present invention is the supercharging control system of the internal combustion engine according to any one of the first to the fourth aspects of the present invention, comprising:

at least one of gas quantity detecting means for detecting a gas quantity flowing through the internal combustion engine and boost pressure climbing speed detecting means for detecting a climbing speed of the boost pressure generated by said supercharger; and control variable initial value setting means for setting a control variable initial value that is employed when the control of said drive ratio variable mechanism is changed from the control using said predetermined pattern to the control for the purpose of realizing said target supercharging status.

The sixth aspect of the present invention is the supercharging control system of the internal combustion engine according to any one of the first to the fifth aspects of the present invention, comprising:

at least one of gas quantity detecting means for detecting a gas quantity flowing through the internal combustion engine and boost pressure climbing speed detecting means for detecting a climbing speed of the boost pressure generated by said supercharger; and control manner switching means for prohibiting the control by the complement control means and starting the control by the non-assist control means immediate after said switching time point in a case where the gas quantity at said switching time point exceeds a judgment value or in a case where the climbing speed of the boost pressure exceeds a judging value.

The seventh aspect of the present invention is the supercharging control system of the internal combustion engine according to any one of the first to the fifth aspects of the present invention, wherein said switching time point is judged to be arrived at a time point when either the gas quantity flowing through the internal combustion engine or climbing speed of the boost pressure exceeds as required amount; and said minimum required amount is the minimum amount of the said gas quantity or said climbing speed required to be achieved at the switching time point in order to generate an exhaust energy enough for realizing said target supercharging status without the assist by the electric motor at the end time point of the control by said complement control means.

The eighth aspect of the present invention is a supercharging control system of an internal combustion engine comprising:

a supercharger for supercharging intake air by using exhaust energy;

an electric motor for assisting the supercharger to rotate;

a drive ratio variable mechanism for changing a ratio of the exhaust energy converted into the rotation of the supercharger;

assist control means that controls said electric motor for the purpose of realizing a target supercharging status, while controlling said drive ratio variable mechanism with a predetermined pattern until a switching time point when a status value of said supercharger increases up to a target value corresponding to said target supercharging status or vicinity thereof;

non-assist control means that controls said drive ratio variable mechanism for the purpose of realizing said target supercharging status while stopping power supply to said electric motor after said switching time point;

at least one of gas quantity detecting means for detecting a gas quantity flowing through the internal combustion engine and boost pressure climbing speed detecting means for detecting a climbing speed of the boost pressure generated by said supercharger; and control variable initial value setting means for setting a control variable initial value that is employed when the control of said drive ratio variable mechanism is changed from the control using said predetermined pattern to the control for the purpose of realizing said target supercharging status.

Advantages of the Invention

According to the first aspect of the present invention, the electric motor is controlled for the purpose of realizing the target supercharging status until the switching time point. In this period, the drive ratio variableness mechanism is controlled with the predetermined pattern, and the target supercharging status is realized as a result of the both controls. During the predetermined period after the arrival of the switching time point, the drive ratio variableness mechanism is controlled for the purpose of realizing the target supercharging status, while the electric motor is controlled for the purpose of generating the complement torque or maintaining the revolution number of the supercharger. At this stage, even if the exhaust energy is not enough, the revolution number of the supercharger would not drop since the electric motor complements the torque. When the exhaust energy is raised enough, the power supply to the electric motor is stopped so as to realize the target supercharging status only by the control of the drive ratio variableness mechanism. At this stage, the revolution number of the supercharger responds to the status change of the drive ratio variableness mechanism with a high sensibility, thus the smooth operation of the supercharger is not deteriorated after the assist of the electric motor is stopped.

According to the second aspect of the present invention, the electric motor is controlled in a feedback manner so that the status value of the supercharger accords with the target value until the switching time point. During this period, the drive ratio variableness mechanism is controlled using a predetermined pattern, whereby an interference of both controls can be avoided. Further, during the predetermined period after the switching time point, the drive ratio variableness mechanism is controlled in a feedback manner so that the status value of the supercharger accords with the target value. During this stage, the electric motor is controlled using a predetermined pattern, whereby the interference of both controls can be also avoided. The interference of both controls does not occur after the exhaust energy is raised enough since the control of the electric motor is stopped. According to the present invention, therefore, it is possible to proceed the switching of the controls without deteriorating the smooth operation of the supercharger.

According to the third aspect of the present invention, it is possible to reduce the assist force generated by the electric motor, i.e., the complement torque up to zero as the predetermined period advances after the switching time point. The exhaust energy increases as time advances after the switching time point. As a result, the complement torque that the electric motor should generate gradually shrinks. According to the present invention, since the assist force by the electric motor shrinks smoothly, the switching of the controls can be proceeded while making the supercharger operate smoothly in the target supercharging status.

According to the fourth aspect of the present invention, at least one of the switching time point and the predetermined period can be set based on at least one of the gas quantity and the climbing speed of the boost pressure. The gas quantity and the climbing speed of boost pressure correlate with the exhaust energy, thus it can be determined that the more the gas quantity is, the earlier the assist by the electric motor can become extinct, that is, the faster the switching time point can be set, or the shorter the predetermined period can be set. The present invention sets at least one of the switching point and the predetermined period according to the above tendency, thereby it makes possible to reduce the electric power consumption by the electric motor.

According to the fifth aspect of the present invention, it is possible to set the control variable initial value that is employed when the control of the drive ratio variable mechanism is changed from the control by the predetermined pattern to the control for the purpose of realizing the target supercharging status based on at least one of the gas quantity and the climbing speed of the boost pressure. The gas quantity and the boost pressure climbing speed correlate with the amount of the exhaust energy, thus it can be judged that the more the gas quantity is, or the faster the boost pressure climbing speed is, the smaller the exhaust energy that is necessary to realize the target supercharging status. The present invention sets the control variable initial value of the drive ratio variable mechanism according to the above tendency, thereby it makes possible to utilize the exhaust energy appropriately as drive power of the supercharger from immediate after the control is switched.

According to the sixth aspect of the present invention, it is possible to stop the assist by the electric motor immediate after the switching time point while omitting the period in which the electric motor should generate the complement torque when it is determined at the switching time point that the gas quantity exceeds the judgment value, or the boost pressure climbing speed exceeds the judgment value. Under such a condition, since the exhaust energy arises high enough at the stage of the switching time point, it is possible to realize the target supercharging status by controlling the drive ratio variableness mechanism adequately afterward even if the assist of the electric motor is stopped immediately. According to the present invention, useless electrical power consumption can be effectively prevented from occurring under such a situation.

According to the seventh aspect of the present invention, the arrival of the switching time point is determined at the stage when the gas quantity or the boost pressure climbing speed reaches the minimum smallest requirement. When the arrival of the switching time point is judged in the stage, the status in which the target supercharging status is realized only by the exhaust energy can be created quickly, while suppressing the assist by the electric motor to necessity minimum. According to the present invention, therefore, it is possible to provide superior responsibility to the internal combustion engine, while effectively suppressing the electric power consumption.

According to the eighth aspect of the present invention, the electric motor is controlled for the purpose of realizing the target supercharging status until the switching time point. In this period, the drive ratio variableness mechanism is controlled with the predetermined pattern, and the target supercharging status is realized as a result of the both controls. After the arrival of the switching time point, the electric power supply to the electric motor is stopped so as to realize the target supercharging status only by controlling the drive ratio variableness mechanism. When the arrival of the switching time point is determined at the stage, the revolution number of the supercharger responds to the status change of the drive ratio variableness mechanism with a high sensibility at this stage, thus the smooth operation of the supercharger is not deteriorated after the assist of the electric motor is stopped. Further, according to the present invention, the control variable initial value that is employed when the control of the drive ratio variable mechanism is changed from the control by the predetermined pattern to the control for the purpose of realizing the target supercharging status in the vicinity of the switching time point is set based on at least one of the gas quantity and the boost pressure climbing speed. The gas quantity and the boost pressure climbing speed correlate with the amount of the exhaust energy, thus it can be judged that the more the gas quantity is, or the faster the boost pressure climbing speed is, the smaller the exhaust energy that is necessary to realize the target supercharging status. The present invention sets the control variable initial value of the drive ratio variable mechanism according to the above tendency, thereby it makes possible to utilize the exhaust energy appropriately as drive power of the supercharger from immediate after the control is switched.

BRIEF DESCRIPTION OF DRAWINGS

FIG. 6 is a flow chart of a routine executed in a fourth embodiment of the present invention; and FIG. 7 is a flow chart of a routine executed in a fifth embodiment of the present invention.

DESCRIPTION OF REFERENCE NUMERALS

10 Internal combustion engine
22 Super charger
28 Electric motor
38 Movable valve (VN)
50 ECU (Electronic Control Unit)
Nt Super charger revolution number
Nt0 Target revolution number

BEST MODE FOR CARRYING OUT THE INVENTION

First Embodiment

Configuration of First Embodiment

Figure 1:
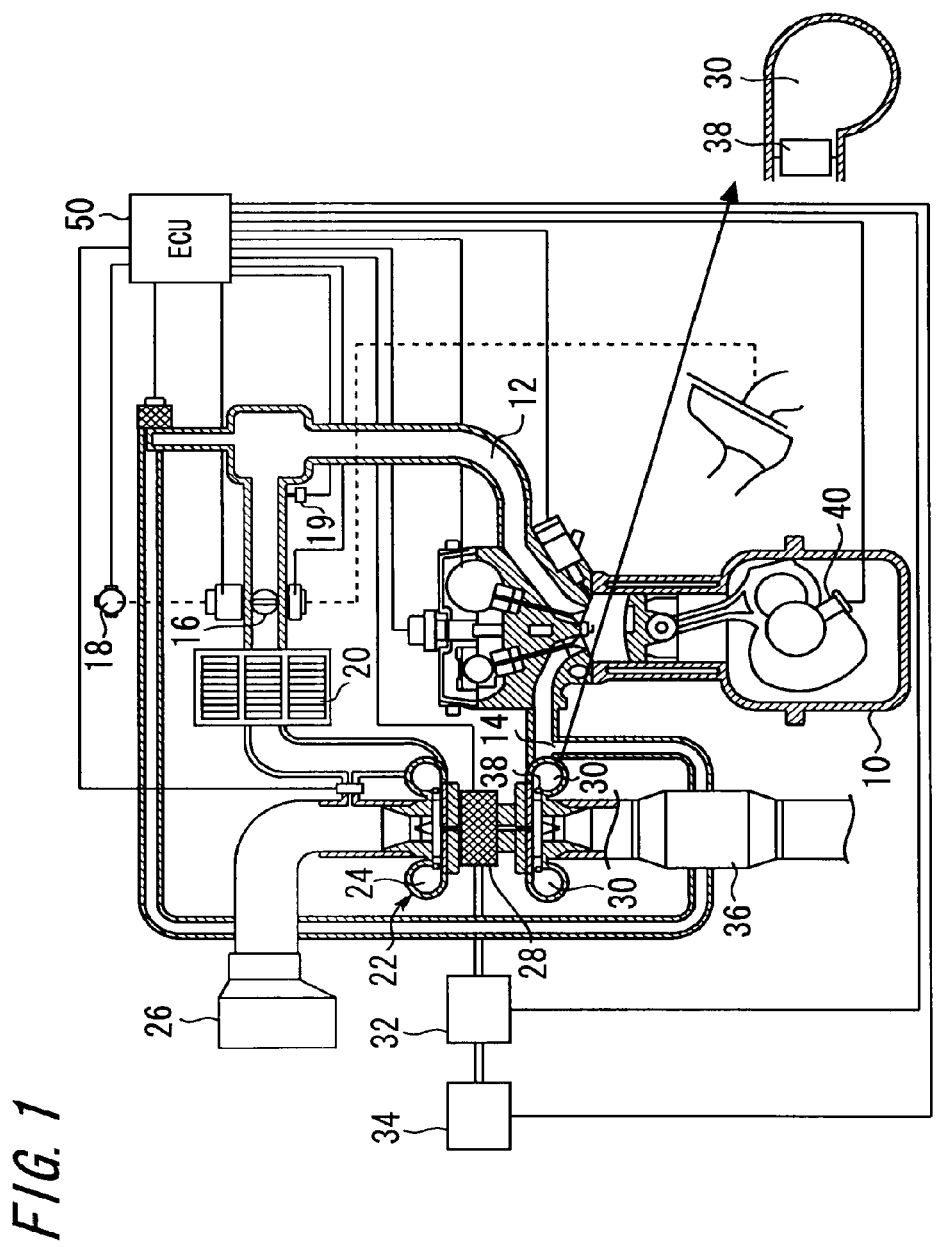
FIG. 1 is a drawing for explaining the configuration of a first embodiment of the present invention.

FIG. 1 is a drawing for explaining the configuration of a first embodiment of the present invention. The system shown in FIG. 1 comprises an internal combustion engine 10. The internal combustion engine 10 is communicated with an intake air path 12 and an exhaust path 14. The intake air path 12 is provided with a throttle valve 16 of an electronic control type. The opening degree of the throttle valve 16 can be detected by a throttle position sensor 18. The intake air path 12 is also provided with a pressure sensor 19 for detecting the inside pressure thereof.

The upstream of the throttle valve 16 communicates with, through intercooler 20, a supercharger (turbocharger) 22 at a compressor 24 thereof. The upstream of the compressor 24 communicates with atmospheric air through air filter 26.

The supercharger 22 possesses an electric motor 28 and a turbine 30 together with the compressor 24. The compressor 24, the electric motor 28 and the turbine 30 have an integrated rotating shaft. Because of this, each of the electric motor 28 and the turbine 30 can give the compressor 24 driving force, respectively.

The electric motor 28 is connected to a controller 32. The electric motor 28 has a function to produce a signal which represents a true revolution number Nt of the supercharger 22 so as to supplies it to the controller 32. The controller 32 receives an electric power supply from a battery 34. Upon receiving a command from external, the controller 32 controls the electric power supplied to the electric motor 28 in a feedback manner so that the true revolution number Nt approaches to a value corresponding to the command.

The turbine 30 communicates with an exhaust port of the internal combustion engine 10 at the upstream side thereof, while communicating with an exhaust purification catalyst 36 at the downstream side thereof. The turbine 30 is a mechanism which converts energy of the exhaust gas into a revolution of the supercharger 22. Inside of the turbine 30 is provided with a movable nozzle (VN) 38 for changing a passage area for the exhaust gas. The VN 38 can change an opening degree in response to an order supplied from external. A ratio of exhaust energy converted into a revolution of the supercharger 22 rises as the opening degree of the VN gets small because the passage of the exhaust gas becomes squeezed. Because of this, it becomes easy for the supercharger 22 to operate in a high revolution region as the opening degree of the VN 38 decreases.

The internal combustion engine 10 is equipped with a revolution number sensor 40 for detecting an engine revolution number Ne. The output of the revolution number sensor 40 is supplied to an ECU (Electronic Control Unit) 50 with the outputs of the throttle position sensor 18 and the pressure sensor 19. The ECU 50 is a unit used for controlling the system according to the present embodiment. The ECU 50 can detect the true supercharger revolution number Nt by using a function of the electric motor 28 as same as the controller 32. Because of this, the ECU 50 can perform feedback control for each of the electric motor 28 and the VN 38 to make the true revolution number Nt agree with the target revolution number Nt0.

The ECU 50 implements the feedback control of the electric motor 38 by the following treatment, in concrete terms.

1. Detecting a true revolution number Nt of the supercharger 22;

2. Preparing a command for making the true revolution number Nt approach to the target revolution number Nt0 based on the detected true revolution number Nt; and 3. Supplying the prepared command to the controller 32.

Further, the ECU 50 implements the feedback control of the VN 38 by the following treatment, in concrete terms.

1. Detecting the true revolution number Nt of the supercharger 22;

2. Setting an opening degree changing amount which should be applied to the VN 38 by the technique of proportional-plus-integral-plus-derivative control (PID control), based on the difference between the detected true revolution number Nt and the target revolution number Nt0 (this point is explained in detail later).

3. Actuating the VN 38 so that the set opening degree changing amount occurs.

In the present embodiment, the ECU 50 can also control each of the electric motor 28 and the VN 38 in non-feedback manner. In other words, the ECU 50 also can set the command to the controller 32 and the command to the VN 38 without considering the true revolution number Nt of the supercharger 22.

Without concerning whether the ECU 50 performs a feedback control or an open control, the controller 32 always controls the electric power to the electric motor 28 in the feedback manner in order to make the true revolution number Nt agree with a command from the ECU 50 (this control is executed with a speed of around 100 times to the procedure cycle of the ECU 50). Hereinafter, both of "Feedback control" and "Open control" will be used as terms referring to the control manner of the ECU 50 for avoiding confusion between the feedback control by ECU 50 and the feedback control by the controller 32. Stated another way, even if the controller 32 performs the feedback control, it is described that "open control is applied to the electric motor 28" when the ECU 50 performs the open control.

Feature of First Embodiment

Super charger 22 implements a supercharging of the intake air by driving the compressor 24 using exhaust energy. In the low revolution region, delay is apt to be occurred after an accelerating is required and before the boost pressure rises because of a little exhaust energy. In the system of the present embodiment, the response of the supercharging can be improved by generating the assist by the electric motor 28 under such a situation.

Further, the system according to the present embodiment can create a satiation suitable for generating a high boost pressure with a little exhaust energy by reducing the opening degree of the VN in a low revolution region. On the other hand, in a high revolution region, it is possible to prevent the supercharger revolution number Nt from increasing needlessly by enlarging the opening degree of the VN. Because of this, according to the system of the present embodiment, it is possible to assure good responsibility in all operating ranges of the internal combustion engine 10 by controlling the electric motor 28 and the VN 38 adequately.

More specifically, the system of the present embodiment controls the assist force by the electric motor 28 so that the true revolution number Nt of the supercharger 22 reaches the target revolution number Nt0 while fixing the VN 38 to a predetermined opening degree firstly, when a requirement of the accelerating is produced in low revolution region where exhaust energy is small enough. It is difficult to raise a true revolution number Nt up to a target revolution number Nt0 immediately even if opening degree of the VN is lowered enough in the region where exhaust energy is small enough. According to the system of the present embodiment, superior rising can be assured even under such a situation by utilizing the assist by the electric motor 28.

When the revolution number Nt of the supercharger 22 rises, the boost pressure rises so as to increase the gas quantity flowing through the internal combustion engine 10. Because of this, the exhaust energy supplied to the turbine 30 increases rapidly after the assist by the electric motor 28 is started. When the exhaust energy becomes large to some extent, a condition in which the target revolution number Nt0 can be implemented only by controlling the opening degree of the VN 38 without using the assist by the electric motor 28 is achieved. When this condition is achieved, the system of the present embodiment stops power supply to the electric motor 28, and then starts control of the VN 38 for keeping the target revolution number Nt0.

Actuation of electric motor 28 accompanies power consumption. Because of this, it is desirable to stop the assist by the electric motor 28 under the situation in which the target revolution number Nt0 can be kept only by an exhaust energy. According to the system of the present embodiment, the requirement can be satisfied, and superior response can be given to the internal combustion engine 10 without generating unnecessary power consumption.

It should be noted that it is necessary to vanish the assist force by the electric motor 28 during the process in which the exhaust energy increases, in order to implement the above mentioned operation. However, if the assist power becomes extinct, the driving torque applied to the supercharger 22 would fall by the amount corresponding to the extinct assist power. The falling of the driving torque may cause the revolution number Nt of the supercharger 22 to temporarily drop, thereby also inducing hunting of the VN control afterward.

The responsibility of a supercharger revolution number Nt to the change of the VN opening degree becomes higher as the exhaust energy increases. Because of this, it may be possible to instantly supplement the force corresponding to the drop of the driving torque by controlling the opening degree of the VN 38 so as to substantially prevent the supercharger revolution number Nt from falling, if the assist force of the electric motor 28 is made be extinct after the exhaust energy has grown large enough. However, under such a control setting, the period during which the electric motor 28 performs the assist is necessarily prolonged; thereby the electric power consumption of the system is apt to increase. Accordingly, the technique in which assist of the electric motor 28 is stopped after exhaust energy has grown large enough is not necessarily the best one as a technique used in the present embodiment.

FIG. 2 is a timing chart for explaining the detail of a characteristic action executed in the present embodiment. According to the action shown in FIG. 2, it is possible to vanish the assist force of the electric motor 28 as early as possible after the assist is started, and the drop of a supercharger revolution number Nt due to the extinction can be prevented from occurring. In FIG. 2, time t0 represents a time at which an accelerating requirement arises in a low revolution region. In the system of the present embodiment, a feedback control of the electric motor 28 by ECU 50 and an open control of the VN 38 are started firstly when such an accelerating requirement arises.

Figure 2A:
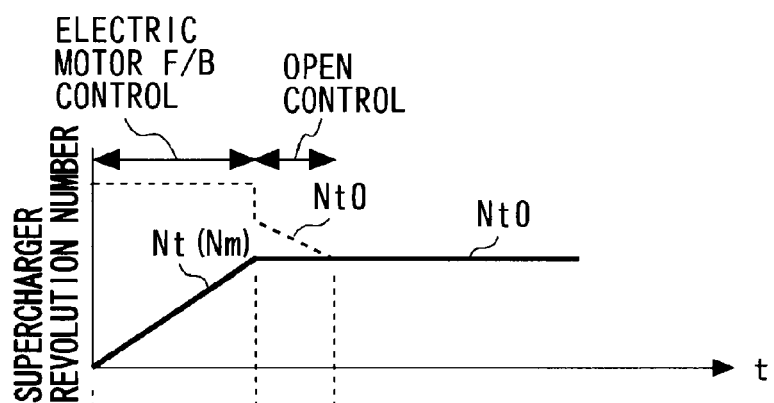
FIG. 2 is a timing chart for explaining the detail of a characteristic action executed in the first embodiment of the present invention.
Figure 2B:
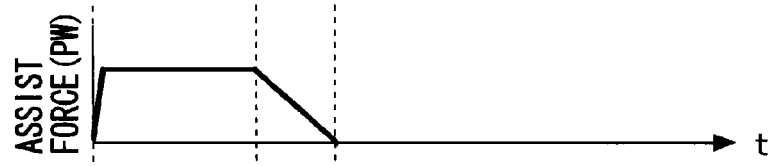
Figure 2C:
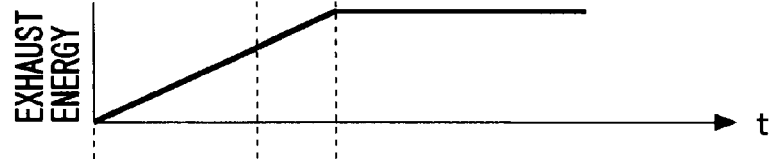
Figure 2D:
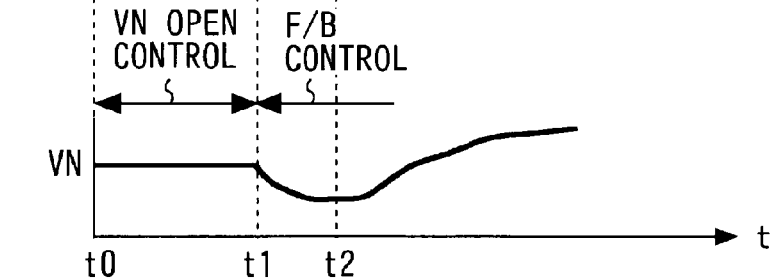

The wave profile depicted in FIG. 2(A) by the continuous line represents supercharger revolution numbers Nt (i.e. revolution number Nm of the electric motor 28). Further, the wave profile depicted in FIG. 2 (A) by the broken line represents a command (a target revolution number Nt0) supplied from the ECU 50 to the controller 32. As shown by these wave profiles, the ECU 50 provides the controller 32 a target revolution number Nt0 which is much higher than the supercharger revolution number Nt after time t0. More concretely, the ECU 50 sets a target revolution number Nt0 for rendering the electric motor 28 to generate the maximum torque based on the true revolution number Nm fed back from the electric motor 28, and then supplying the target revolution number Nt0 to the controller 32.

FIG. 2 (B) shows a wave profile which schematically represents assist power output by the electric motor 28. The controller 32 supplies the acceptable maximum electric power to the electric motor 28 when a target revolution number Nt0 such as discussed above is given to the controller 32 after time t0. As a result, the electric motor 28 operates after time t0 so as to generate the maximum torque. The supercharger revolution number Nt arises promptly after time t0 as shown in FIG. 2 (A), because the electric motor 28 produces such an assist power.

FIG. 2 (C) schematically shows a change of the exhaust energy occurring after time t0. When a revolution number Nt of supercharger 22 rises, boost pressure rises so as to increase the gas quantity. When a gas quantity increases, the exhaust energy increases, too. Because of this, the exhaust energy increases with passage of time as shown in FIG. 2 (C) after time to.

FIG. 2 (D) shows opening degrees of the VN 38. As shown in FIG. 2 (D), the VN 38 is fixed to a predetermined opening degree at the time point of time t0, and then controlled in an open manner so as to keep the opening degree until time t1.

During a period immediately after the accelerating requirement is produced at time t0, it is impossible to implement the target revolution number Nt0 without using the assist of the electric motor 28 even if the opening degree of the VN is minimized since the exhaust energy is small. As a technique a technique to raise the supercharger revolution number Nt to the target revolution number Nt0 at this stage, it is conceivable that, for example, executing feedback controls for both of the electric motor 28 and the VN 38 based on the difference between the true revolution number Nt and the target revolution number Nt0. However, employing such a technique would cause the feedback control for the electric motor 28 and the feedback control for the VN 38 to interfere each other, thereby producing a situation in which the revolution number Nt of the supercharger 22 does not rise smoothly.

In contrast, controlling the electric motor 28 in a feedback manner while controlling the VN 38 in an open manner after time t0 makes it possible to raise the supercharger revolution number Nt promptly while avoiding the interference of the two controls. Because of this, according to the system of the present embodiment, it is possible to raise the supercharger revolution number Nt smoothly immediate after an accelerating requirement occurs in a low revolution region.

Time t1 shown in FIG. 2 represents timing at which the exhaust energy that has been increasing arrives to a level by which the assist force needed to keep the target supercharger revolution number Nt0 becomes almost the same as the maximum torque of the electric motor 28. In the present embodiment, it is decided that the timing has come when the supercharger revolution number Nt arrives to the vicinities of the target revolution number Nt0 (see FIG. 2 (A)), for convenience. Further, time t2 shown in FIG. 2 represents timing at which the exhaust energy that has been increasing arrives to a level by which the target supercharger revolution number Nt0 can be kept without using assist power by the electric motor 28. In the present embodiment, it is assumed that the timing has come when a predetermined time has passed after the time.

The system of the present embodiment gradually decreases the assist force of the electric motor 28 from the maximum torque until zero after time t1 to time t2, as shown in FIG. 2 (B). In order to implement this operation, the ECU 50 controls the electric motor 28 in an open manner from time t1 through time t2 as shown in FIG. 2 (A).

More concretely, the ECU 50 gradually decreases the command (goal revolution number Nt0) which should be supplied to the controller 32 from a predetermined initial value to the target revolution number Nt0 at which the revolution number should be converged finally from time t1 through time t2. As shown in FIG. 2 (C), the exhaust energy continues rising even after time t1 until time t2 (because of the rising of the boost pressure occurred after time t1). Particularly, in the system of the present embodiment, a condition setting is done so that time t1 is determined to come under a situation in which a gas quantity flowing through the internal combustion engine (or an increasing speed of the boost pressure) exceeds the "minimum required amount". Here, the above mentioned "minimum required amount" is the minimum value of a gas quantity (or an increasing speed of the boost pressure) that is necessary to be assured at the time when the open control of the electric motor 28 is started in order to ensure that an exhaust energy enough for keeping the target supercharger revolution number Nt0 without using an assist by the electric motor 28 is produced at the time when the open control is finished. Because such a condition setting is accomplished, the exhaust energy arrives at a value by which the target supercharger revolution number Nt0 (to which the revolution number should be converged finally) can be kept without an assist by the electric motor 28 at the time point of time t2.

Stated another way, the target revolution number Nt0 which should be finally realized cannot be realized only by using exhaust energy even if the VN 38 is controlled in any status from time t1 through right before time t2. The command supplied to the controller 32 as an initial-value of the open control at time t1 is a value to make the electric motor 28 supplement the difference between the driving force that can be assured at that time point and the driving force necessary to realize the final target revolution number Nt0. Likewise, the commands repeatedly provided from the ECU 50 to the controller 32 momentarily after time t1 until time t2 are set to values to make the electric motor 28 generate the complement torque that is necessary to realize the final target revolution number Nt0.

A pattern of the commands which should be output from time t1 through time t2 is stored in the ECU 50 previously. After the supercharger revolution number Nt reaches a target supercharger revolution number Nt0, the ECU 50 changes the command to the controller 32 according to the pattern. As a result, the assist force generated by the electric motor 28 decreases after time t1 while appropriately supplementing the torque that would be lacking when only exhaust energy is utilized, and becomes extinct at time t2, as shown in FIG. 2 (B).

As shown in FIG. 2 (D), ECU 50 starts feedback control of the VN 38 from time t1. In other words, the open control of the electric motor 28 for generating a complement torque and the feedback control of the VN 38 to make a supercharger revolution number Nt agree with the target revolution number Nt0 are executed at the same time from time t1 through time t2, in the system according to the present embodiment.

As described above, the feedback control of the VN 38 is performed by the technique of PID control. To be concrete, when the assist by the electric motor 28 is started at time t0, the ECU 50 begins to calculate a proportional term (P term), an integral term (I term) and a derivative term (D term) as for the difference ΔNt between a supercharger revolution number Nt and a target revolution number Nt0 which should be finally realized afterwards. Further, the ECU 50 calculates a feedback control amount by adding those P term, I Term, and D term. At time t1, an initial opening degree of the VN 38 for starting the feedback control is determined based on the feedback control amount which has calculated at that time point. Further, after time t1, the VN opening degree is controlled based on the feedback control amount calculated momentarily.

In the stage from time t1 through time t2, it is difficult to realize target revolution number Nt0 by merely the feedback control of the VN 38, that is, by merely the exhaust energy. In contrast, the shortage amount can be supplemented by the complement torque of the electric motor 28, according to the above mentioned treatment. Because of this, it is possible to keep the target revolution number Nt0 with a minimum power consumption, according to the above mentioned treatment. Further, it is possible as same as before time t1 to prevent the control of the electric motor 28 and the control of the VN 38 from interfering according to the above mentioned treatment, because that the control of the electric motor 28 is open control. Because of this, smooth operation of the supercharger 28 can be maintained also in this stage according to the system of the present embodiment.

As discussed above, the exhaust energy increases to the value that can hold the target revolution number Nt0 without an assist by the electric motor 28 at the time point of time t2. Because of this, the ECU 50 stops the power supply to the electric motor 28 at time t2, and then continues only the feedback control of the VN 38. It is possible to keep the supercharger 22 in a desired supercharging condition without being accompanied with useless electrical power consumption according to such a control. As explained above, the operation shown in FIG. 2 make it possible to operate the supercharger 22 smoothly in a desired status, while making the assist power by the electric motor 28 become extinct as early as possible.

Concrete Procedure In First Embodiment

Figure 3:
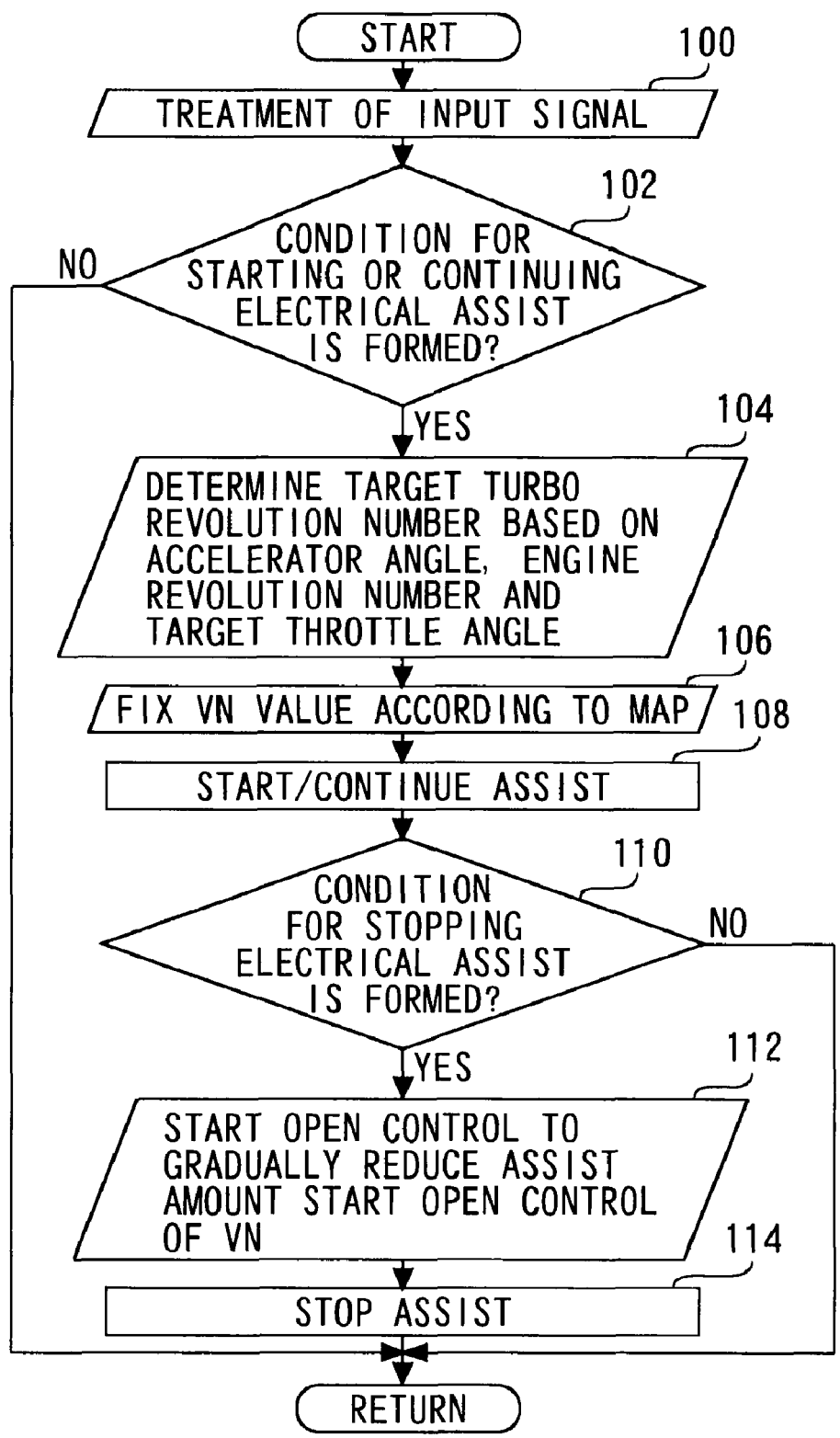
FIG. 3 is a flowchart of a routine executed in the first embodiment of the present invention.

FIG. 3 is a flowchart of the routines which the ECU 50 performs to realize the above mentioned action. In the routine shown in FIG. 3, the treatment of various input signals that is necessary to grasp an operating status of the internal combustion engine 10 is performed firstly (step 100). To be concrete, calculation of a change rate A TA of the throttle angle TA, detection of a engine revolution number Ne and a engine load KL, detection of a supercharger revolution number Nt or the like are executed.

Next, it is determined whether condition for starting or continuing the assist by the electric motor 28 is formed or not (step 102). The ECU 50 can detect an accelerating requirement by the driver based on a change of an accelerator angle or a change of the throttle angle. Further, the ECU 10 can determine whether the assist by the electric motor 28 is necessary to realize a desired accelerating requirement based on an engine revolution number Ne and a supercharger revolution number Nt. A map in which necessity of the assist is defined by using an accelerator angle and an engine revolution number Ne as parameters is stored in the ECU 50. In the present step 102, the determination discussed above is executed according to the map. According to the example shown in FIG. 2, the condition for starting or continuing the assist is determined to be formed after time t0 until time t2.

When neither the start condition nor the continuation condition of the electric assistant is judged to be satisfied, this processing cycle is just finished. On the other hand, if it is judged that the above mentioned condition is satisfied, a target supercharger revolution number Nt0 corresponding to the current operating status is determined next (step 104). The target supercharger revolution number Nt0 is a parameter that should be determined so as to respond to what kind of operating status the driver requires. the operating status which the driver requires can estimate based on, for example, an accelerator angle, an engine revolution number Ne, and a target throttle angle. Thus, the target supercharger revolution number Nt0 can be determined based on those parameters. A map in which target supercharger revolution numbers Nt0 are defined by the relationship with those parameters is stored in the ECU 50. Here, the target supercharger revolution number Nt0 is determined by referring to the map.

As explained while referring to FIG. 2, the ECU 50 sets a target revolution number Nt0 that is enough larger than a supercharger revolution number Nt after detecting the necessity of the assist by the electric motor 28 until the supercharger revolution number Nt gets closer to the final target revolution number Nt0, in order to make the electric motor 28 generate the maximum torque. In step 104 described above, more concretely, the target revolution number Nt0 is set so that such a condition is satisfied while referring to the above mentioned map.

Next, an open control of the VN 38 is started so that an opening degree of the VN 38 is fixed to a predetermined value (step 106). The opening degree at which the VN 38 is fixed right after the assist by the electric motor 28 is started is stored in the ECU 50. In this stage, a command is output to the VN 38 so that the opening degree is realized.

Next, a procedure to start or continue the assist by the electric motor 28 is executed (step 108). To be concrete, the target revolution number Nt0 set in the above mentioned step 104 is supplied to the controller 32. As a result, an assist by the electric motor 28 is started.

In the routine shown in FIG. 3, next, it is determined whether a condition to stop the assist by the electric motor 28, more strictly, the condition under which the assist by the maximum torque under the feedback control should be stopped is formed or not (step 110). As discussed above, the ECU 50 judges that the above mentioned condition is formed when the exhaust energy has increased to the extent under which the assist force to keep the target revolution number Nt0 which should be finally realized becomes almost the same as the maximum torque of the electric motor 28. In the system according to the present embodiment, the formation of the condition can be recognized at the time point when the true revolution number Nt of the supercharger 22 has reached the target revolution number Nt0 which should be finally realized. Because of this, in this step 110, it is determined whether the true revolution number Nt has reached the final target revolution number Nt0, more concretely.

When the condition of the above step 110 is judged not to form, the present procedure cycle is just finished. In this case, the assist by the maximum torque is continued afterward. On the other hand, when the formation of the condition of the above step 110 is recognized, the open control of the electric motor 28 for gradually reducing the assist amount and the feedback control of the VN 38 are commanded to start (step 112).

A rule to determine a command supplied to the controller 32 after starting the open control is stored in the ECU 50. According to this rule, the command to the controller 32 is set to the value that makes the electric motor 28 generate the maximum torque at the time point when the condition of the above step 110 is formed for the first time (time t2 shown in FIG. 2). The command is reduced gradually afterward with passage of time so as to reach the target revolution number Nt0 which should be finally realized at the time point where predetermined time has passed. In this procedure, the assist force of the electric motor 28 vanishes at the time point when the predetermined time has passed, because the true revolution number Nt is controlled to the final target revolution number Nt0.

Responding to the processing of the above step 112, the ECU 50 also starts the feedback control of the VN 38. To be concrete, it starts a control in which the difference between the true revolution number Nt and the target revolution number Nt0 is detected, and the opening degree of the VN is adjusted so that the difference becomes extinct. As a result of this feedback control which is executed with the open control of the electric motor 28, the true revolution number Nt of the supercharger 22 is accurately controlled to the target revolution number Nt0 which should be finally realized.

When the predetermined time during which the open control of the electric motor 28 should be continued has passed after the condition of the above step 110 is formed (that is, when the time point at which the assist power vanishes has come), the ECU 50 stops the assist by the electric motor 28 (step 114). To be concrete, it outputs to the controller 32 a command of the effect to prohibit power supply to the electric motor 28. As a result of the execution of the processing, the target revolution number Nt0 is maintain afterward only by the feedback control of the VN 38 in the system according to the present embodiment.

As explained above, it is possible to make the electric motor 28 generate the necessity minimum assist before the exhaust energy arises when an accelerating requirement is produced in a low revolution region according to the routine shown in FIG. 3. Further, according to the present routine, it is possible to make the electric motor 28 generate the complement torque in synchronism with the arising of the exhaust energy, then make the electric motor 28 stop generating the assist completely at the time point when the exhaust energy arises enough. Because of this, it is possible to improve enough the responsibility of the supercharger 22 in the low revolution region while restraining the electrical power consumption by the electric motor 28 enough, according to the system of the present embodiment.

Although the status of the supercharger 22 is controlled by the supercharger revolution number Nt and the target revolution number Nt0 in the above described first embodiment, the way of the control is not limited to this. In other words, it may be possible to control the status of the supercharger 22 by the true boost pressure and the target boost pressure.

Further, although the target supercharger revolution number Nt0 supplied to the controller 32 is fixed to an enough large value when an accelerating requirement is produced in a low revolution region in the above described first embodiment (FIG. 2 (A)), the technique of the control used in this stage is not limited to this. That is, all things to be required in this stage is making the electric motor 28 generate a large torque so that the supercharger revolution number Nt approaches the target supercharger revolution number Nt0 quickly, any technique may be used to control the electric motor 28 as far as this requirement is satisfied.

Further, although the ECU 50 controls the electric motor 28 by changing commands to the controller 32 in the first embodiment, the technique of the control is not limited to this. That is, the ECU 50 may directly control the electric power supply to the electric motor 28. In this case, the same operation as that of the first embodiment can be realized by controlling the electric power supply to the electric motor 28 in a feedback manner from time t0 thorough time t1 shown in FIG. 2, reducing the electric power supply gradually from time t1 through time t2, and vanishing the electric power supply at time t2.

Further, although the assist by the electric motor 28 is always stopped via the open control of the electric motor 28 after the true revolution number Nt of the supercharger 22 has reached the final target revolution number Nt0 in the first embodiment, the technique to control the electric motor 28 is not necessarily limited to this. That is, a large amount of gas may be flowing through the internal combustion engine at the time when the supercharger revolution number Nt has reached the target revolution number Nt0 in some operating condition of the internal combustion engine 10. Under such a situation, a condition in which the target supercharger revolution number Nt0 can be maintained enough only by the feedback control of the VN 38 may have been formed before the time point where Nt reaches Nt0, because the exhaust energy becomes larger as the quantity of the gas increases. Because of this, an alternative may be usable in which a gas quantity is detected at the time point when the true supercharger revolution number Nt reaches the target revolution number Nt0, and the assist of the electric motor 28 is immediately stopped while omitting the open control of the electric motor 28 if the gas quantity is large enough.

Even more particularly, the parameter for determining whether the open control of the electric motor 28 should be executed or not is not limited to the gas quantity at the time point when the supercharger revolution number Nt has reached the target revolution number Nt0. That is, the large or small of the exhaust gas can be determined also by the climbing speed ΔPim of the boost pressure produced in a subsequent stage of the supercharger 22, other than the gas quantity flowing through the internal combustion engine 10. Because of this, the determination whether the open control of the electric motor 28 should be executed or not may be carried out based on, replacing from the above mentioned gas quantity, the climbing speed ΔPim of the boost pressure at the time point when the supercharger revolution number Nt has reached the target revolution number Nt0.

It is be noted that, in the above described first embodiment, the VN 38 corresponds to the "drive ratio variable mechanism" in the first aspect of the present invention, time t1 shown in FIG. 2 corresponds to the "switching time point" in the first aspect of the present invention, and the supercharger revolution number Nt corresponds to the "status value" in the first aspect of the present invention, respectively. Further, the "assist control means" in the first aspect of the present invention is realized when the ECU 50 performs the processing of steps 104 to 108 so as to realize the operation shown between time t0 through time t1 in FIG. 2, here. Moreover, the "complement control means" in the first aspect of the present invention is realized when the ECU performs the processing of step 112 so as to realize the operation between time t1 through time t2 shown in FIG. 2, the "non-assist control means" in the first aspect of the present invention is realized when the ECU 50 continues the feedback control of the VN 38 after performing the processing of step 114, respectively, here.

Further, in the above described first embodiment, the "status value detecting means" in the second aspect of the present invention is realized when the electric motor 28 outputs the signal corresponding to the supercharger revolution number Nt. Further, the "means for controlling the electric motor in a feedback manner" in the second aspect of the present invention is realized when the ECU 50 outputs the command to the controller 23 in the above described step 108 so as to bring the supercharger revolution number Nt closer to the target revolution number Nt0. Moreover, "the means for controlling said drive ratio variable mechanism in a feedback manner so that the status value agrees with the target value" and the "means for controlling said electric motor with a pattern that is determined beforehand as one for generating said complement torque" in the second aspect of the present invention are realized when the ECU 50 controls the VN 38 in a feedback manner and controls the electric motor 28 in an open manner after the above mentioned step 112.

Further, in the above described first embodiment, the "means to decrease the command to the electric motor with a predetermined pattern" in the third aspect of the present invention is realized when the ECU 50 decreases the command to the controller 32 so that the complement torque generated by the electric motor 28 is gradually decreases after the above mentioned step 112.

Second Embodiment

Feature of Second Embodiment

Figure 4:
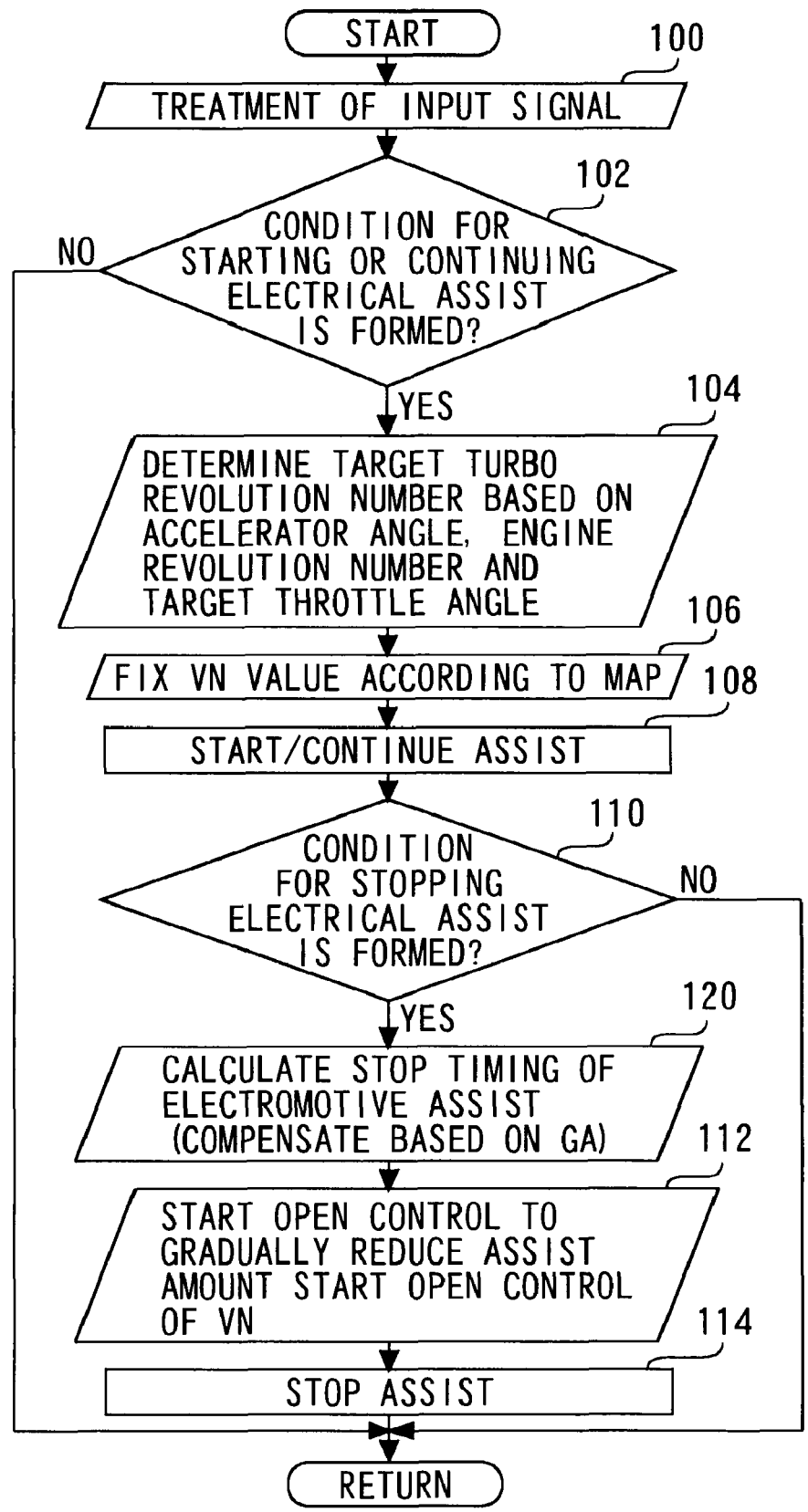
FIG. 4 is a flow chart of a routine executed in a second embodiment of the present invention.

Referring to FIG. 4, the second embodiment of the present invention will be described next. The system of the present embodiment can be implemented when the ECU 50 executes the routine shown in FIG. 4 discussed later in the configuration shown in FIG. 1. It should be noted that the ECU 50 in the present embodiment is assumed to be able to calculate a gas amount (intake air amount Ga) flowing through the internal combustion engine 10 based on the output of the presser sensor 19 and the output of the revolution number sensor 40.

In the first embodiment described above, the period in which the electric motor 28 is controlled in the open manner to generate the complement torque (the period between time t1 to time t2 in FIG. 2) is always fixed to a constant time. However, the period in which the electric motor 28 should generate the complement torque to maintain the target supercharger revolution number Nt changes corresponding to the operating status of the internal combustion engine 10. More specifically, the period under a situation in which the exhaust energy arises quickly is shortened with compare to that under a normal situation.

The exhaust energy becomes larger as the gas quantity flowing through the internal combustion engine 10 increases. Because of this, the period during which the electric motor 28 should generate the complement torque can be shortened as the gas quantity flowing through the internal combustion engine 10 increases. Thus, the more the intake air amount Ga of the internal combustion engine 10 is, the shorter the period during which the electric motor 28 is controlled in the open manner is set, with regard to the treatment for stopping the assist by the electric motor 28 in the present embodiment.

Concrete Procedure In Second Embodiment

FIG. 4 is a flowchart of a routine to realize the above described function. The routine shown in FIG. 4 is identical with the routine shown in FIG. 3 except that step 120 is inserted between step 110 and step 112. As regards the steps that are common in the both, their description is omitted or abridged with the same reference numerals assigned, hereinafter.

In the routine shown in FIG. 4, the stop timing of the electrical assist, more concretely, the timing at which the complement torque by the electric motor 28 should be made zero is calculated based on the intake air amount Ga, when it is recognized that the condition to stop the assist is formed in step 110 (step 120). The more the intake air amount Ga is, the shorter the time T before the exhaust energy increases to the extent by which the target revolution number Nt0 can be maintained without relying on the assist by the electric motor 28 after the supercharger revolution number Nt reaches the target revolution number Nt0 (see time t1 in FIG. 2) is. A map in which the time T is defined by the relationship with the intake air amount Ga is stored in the ECU 50. The timing to vanish the complement torque is determined according to the map.

In this embodiment, the ECU 50 gradually reduces the command supplied to the controller 32 so that the complement torque becomes zero at the timing determined in the above described step 120. Because of this, it becomes possible to make the electric motor 28 generate the complement torque only in an appropriate period that is neither too much nor too little depending on the raising speed of the exhaust energy according to the above described processing. According to the system of the present embodiment, therefore, it is possible to further reduce the power consumption by the electric motor 28 compare to the first embodiment while giving the same level responsibility to the supercharger 22.

Although the period during which the complement torque is generated by the electric motor 28 is changed depending on the volume of the intake air amount Ga generated after starting the assist by the electric motor 28 in the above described second embodiment, the object of the change is not limited to this. That is, the stop timing of the feedback control of the electric motor 28 (time t1 in FIG. 2) may be changed depending on the volume of the intake air amount Ga.

Further, although the feedback control of the VN 38 is always started by the same manner without concerning the volume of the intake air amount Ga in the above described second embodiment, the present invention is not limited to this. That is, the volume of the intake air amount may be reflected to the feedback control of the VN 38. More specifically, the initial opening degree of the VN 38 at the start time of the feedback control may be set larger as the intake air amount Ga gets larger. According to such a processing, it becomes possible to further suppress the fluctuation of the supercharger revolution number Nt in the vicinity of the start of the feedback control of the VN 38.

Further, although the open control of the electric motor 28 is always executed following the stop of the feedback control of the electric motor 28 without concerning the volume of the intake air amount Ga in the above described second embodiment, the present invention is not limited to this. That is, the status may be changed to one in which the target revolution number Nt0 is maintained only by the feedback control of the VN 38 immediately after the time point at which the feedback control of the electric motor 28 is stopped while omitting the open control of the electric motor 28, in a case where the intake air amount Ga has already increased to an enough large value.

It should be noted that the "gas quantity detecting means" in the fourth to the sixth aspect of the present invention is realized when the ECU 50 calculates the intake air amount Ga based on the outputs of the pressure sensor 19 and the revolution number sensor 40 in the above described second embodiment. Also, the "assist variables setting means" in the forth aspect of the present invention is realized when the ECU 50 performs the processing of step 120, here.

Further, the initial opening degree of the VN 38 at the start time of the feedback control in the above described second embodiment corresponds to the "control variable initial value" in the fifth aspect of the present invention. Also, the "control variable initial value setting means" in the fifth aspect of the present invention can be realized when the ECU 50 sets the initial opening degree based on the intake air amount Ga or the climbing speed of the boost pressure.

Moreover, the "control manner switching means" in the sixth aspect of the present invention can be realized when the ECU 50 omits the open control of the electric motor 28 in a case where the intake air amount Ga at the stop timing of the feedback control of the electric motor 28 exceeds a judgment value.

Further, in the above described second embodiment, the "assist control means" in the eighth aspect of the present invention can be realized when the ECU 50 performs the processing of steps 104 to 108, and the "non-assist control means" in the eighth aspect of the present invention can be realized when the ECU 50 stops the electrical assist and starts the feedback control of the VN 38 immediately after the condition of step 110 is satisfied, respectively. Also, the "control variable initial value setting means" in the eighth aspect of the present invention can be realized when the ECU 50 set the initial opening degree based on the intake air amount Ga.

Third Embodiment

Feature of Third Embodiment

Figure 5:
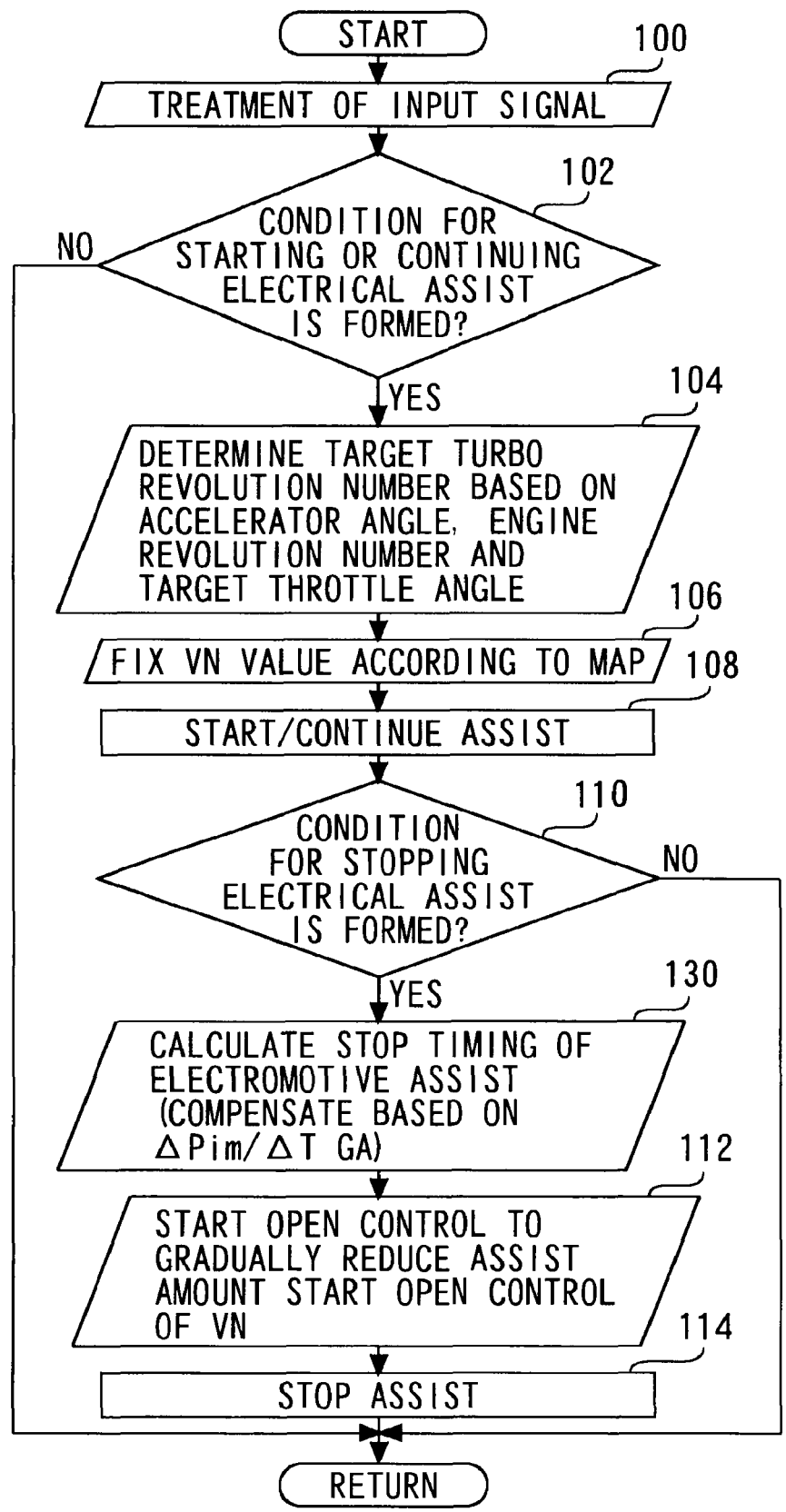
FIG. 5 is a flow chart of a routine executed in a third embodiment of the present invention.

Referring to FIG. 5, the third embodiment of the present invention will be described next. The system of the present embodiment can be implemented when the ECU 50 executes the routine shown in FIG. 5 discussed later in the configuration shown in FIG. 1. It should be noted that the ECU 50 in the present embodiment is assumed to be able to detect a changing rate ΔPim of the boost pressure based on an output of the pressure sensor 19.

In the second embodiment described above, the initial opening degree is set based on the intake air amount Ga when the feedback control of the VN 38 is started. More specifically, the initial opening degree of the VN 38 is set to be low when the intake air amount Ga is comparatively small. Also, the initial opening degree is set to be comparatively high when the intake air amount Ga is comparatively large. The intake air amount Ga is a physical quantity which has a correlation with exhaust energy. Because of this, a variation of the exhaust energy at the start time of the feedback control can be absorbed by the initial opening degree of the VN 38, thereby the fluctuation of the revolution number of the supercharger 22 can be suppressed to be small enough according to the above described setting technique.

It should be noted that the climbing speed ΔPim of the boost pressure has a large correlation with the exhaust energy similar to the intake air amount Ga in the system of the present embodiment. The climbing speed ΔPim can be used as basic parameter to decide the initial opening degree of the VN 38 in substitution for the intake air amount Ga. Thus, the present embodiment sets the initial opening degree based on the climbing speed ΔPim of the boost pressure when starting the feedback control of the VN 38.

Concrete Procedure In Third Embodiment

FIG. 5 is a flowchart of a routine executed by the ECU 50 in the present embodiment. The routine shown in FIG. 5 is identical with the routine shown in FIG. 4 except that processing following step 110 is replaced from step 120 to step 130. As regards the steps that are common in the both, their description is omitted or abridged with the same reference numerals assigned, hereinafter.

In the routine shown in FIG. 5, the timing at which the complement torque by the electric motor 28 should be made zero is calculated based on the climbing speed ΔPim of the boost pressure, when it is recognized that the condition to stop the assist is formed in step 110 (step 130). The faster the climbing speed ΔPim is, the shorter the time T before the exhaust energy increases to the extent by which the target revolution number Nt0 can be maintained without relying on the assist by the electric motor 28 after the supercharger revolution number Nt reaches the target revolution number Nt0 (see time t1 in FIG. 2) is. A map in which the time T is defined by the relationship with the climbing speed ΔPim is stored in the ECU 50. The timing to vanish the complement torque is determined according to the map.

Similar to the case in the second embodiment, it becomes possible to make the electric motor 28 generate the complement torque only in an appropriate period that is neither too much nor too little depending on the raising speed of the exhaust energy according to the above described processing. According to the system of the present embodiment, therefore, it is possible to reduce the power consumption by the electric motor 28 like the second embodiment.

Although the period during which the electric motor 28 generates the complement torque is changed depending on the climbing speed ΔPim of the boost pressure appeared after the start of the assist by the electric motor 28 in the above described third embodiment, the object which should be changed is not limited to this. That is, what is changed depending on the climbing speed ΔPim may be the time point at which the feedback control of the electric motor 28 is stopped (time t1 in FIG. 2).

Further, although the feedback control of the VN 38 is always started by the same manner without concerning whether the climbing speed ΔPim is high or low in the above described third embodiment, the present invention is not limited to this. That is, the climbing speed ΔPim may be reflected to the feedback control of the VN 38. More specifically, the initial opening degree of the VN 38 at the start time of the feedback control may be set larger as the climbing speed ΔPim gets higher. According to such a processing, it becomes possible to further suppress the fluctuation of the supercharger revolution number Nt in the vicinity of the start of the feedback control of the VN 38.

Further, although the open control of the electric motor 28 is always executed following the stop of the feedback control of the electric motor 28 without concerning whether the climbing speed ΔPim is high or low in the above described third embodiment, the present invention is not limited to this. That is, the status may be changed to one in which the target revolution number Nt0 is maintained only by the feedback control of the VN 38 immediately after the time point at which the feedback control of the electric motor 28 is stopped while omitting the open control of the electric motor 28, in a case where the climbing speed ΔPim is sufficiently high.

It should be noted that the "boost pressure climbing speed detecting means" in the fourth to the sixth aspect of the present invention is realized when the ECU 50 calculates the climbing speed ΔPim based on the output of the pressure sensor 19 in the above described third embodiment. Also, the "assist variables setting means" in the forth aspect of the present invention is realized when the ECU 50 performs the processing of step 130, here.

Further, the initial opening degree of the VN 38 at the start time of the feedback control in the above described third embodiment corresponds to the "control variable initial value" in the fifth aspect of the present invention. Also, the "control variable initial value setting means" in the fifth aspect of the present invention can be realized when the ECU 50 sets the initial opening degree based on the intake air amount Ga or the climbing speed of the boost pressure.

Moreover, the "control manner switching means" in the sixth aspect of the present invention can be realized when the ECU 50 omits the open control of the electric motor 28 in a case where the climbing speed ΔPim at the stop timing of the feedback control of the electric motor 28 exceeds a judgment value.

Further, in the above described third embodiment, the "assist control means" in the eighth aspect of the present invention can be realized when the ECU 50 performs the processing of steps 104 to 108, and the "non-assist control means" in the eighth aspect of the present invention can be realized when the ECU 50 stops the electrical assist and starts the feedback control of the VN 38 immediately after the condition of step 110 is satisfied respectively. Also, the "control variable initial value setting means" in the eighth aspect of the present invention can be realized when the ECU 50 set the initial opening degree based on the climbing speed ΔPim.

Fourth Embodiment

Feature of Fourth Embodiment

Referring to FIG. 6, the forth embodiment of the present invention will be described next. The system of the present embodiment can be implemented when the ECU 50 executes the routine shown in FIG. 6 discussed later in the configuration shown in FIG. 1.

In the first to the third embodiments described above, the initial opening degree is set based on the result of the PID control performed from time t0 thorough time t1. Regarding this, the item P at time t1 is an item that represents how much the supercharger revolution number Nt leaves from the target revolution number Nt0 at the time point. Further, the item I is an item that represents the amplitude of the constant difference from the target revolution number Nt0 occurring in the supercharger revolution number Nt. Even under the situation where the assist force by the electric motor 28 is reduced after time t1, it is conceivable to be appropriate that these items are reflected to the initial opening degree of the VN 38.

On the other hand, the item D represents how fast the supercharger revolution number Nt is approaching the target revolution number Nt0 (or getting away from Nt0). For example, when the supercharger revolution number Nt is rapidly approaching the target revolution number Nt0 at the time right before time t1 by the effect of the electromotive assist, the item D at time t1 is set as an item for enlarging the initial opening degree of the VN 38 to avoid the overshoot of Nt. However, the torque supplied to the supercharger is apt to become insufficient whereby the supercharger revolution number Nt is apt to drop when the initial opening degree of the VN 38 is increased because the assist force by the electric motor 28 shrinks after time t1.

As described above, the item D has a characteristic which may rather deteriorate the feedback control of the supercharger revolution number Nt within the time point where the assist by the electric motor 28 begins to decrease. Because of this, it is decided that the item D should not be reflected to the determination of the initial opening degree as for carrying out the feedback control of the VN 38 in the present embodiment.

Concrete Procedure In Fourth Embodiment

FIG. 6 is a flowchart of a routine to realize the above described function. The routine shown in FIG. 6 is identical with the routine shown in FIG. 3 (first embodiment) except that step 140 is inserted between step 110 and step 112. As regards the steps that are common in the both, their description is omitted or abridged with the same reference numerals assigned, hereinafter.

In the routine shown in FIG. 6, the item D among the basic items of the feedback control amount of the VN 38 is reset, when it is recognized that the condition to stop the assist is formed in step 110 (step 140). The ECU 50 begins to calculate the item P, the item I and the item D as for the revolution deviation ΔNt of the supercharger 22 from the time point when the electromotive assist is started (time t0 in FIG. 2) like the first embodiment. Here, only the item D is reset (brought to zero)) among those items, and as for the item P and the item I, the calculated values are held as they are.

Then, the ECU 50 starts the feedback control of the VN 38 in step 112. At this stage, the ECU 50 sets the initial opening degree of the VN 38 while employing the item P and the item I that are stored as described above. Subsequent to the setting of the initial opening degree, the feedback control using newly calculated item P, item I and item D is executed.

According to the above mentioned processing, the deterioration of the feedback control of the VN 38 due to the item D at the time point where the electromotive assist power begins to decrease can be prevented from occurring. Also, after the electric assist power has begun to fall, it is possible to accurately control the VN 38 in the feedback manner by the technique of the PID control. Because of this, according to the system of the present embodiment, it is possible to improve the smooth nature of the supercharger 22 at the start time of the feedback control of the VN 38 compared to the systems according to the first to the third embodiments.

Fifth Embodiment

Feature of Fifth Embodiment

Referring to FIG. 7, the fifth embodiment of the present invention will be described next. The system of the present embodiment can be implemented when the ECU 50 executes the routine shown in FIG. 7 discussed later in the configuration shown in FIG. 1.

The fourth embodiment described above suppresses the drop of the supercharger revolution number Nt due to the reduction of the electromotive assist force by resetting the item D when starting the feedback control of the VN 38. In contrast, the present embodiment corrects the opening degree of the VN 38 toward a closing side when starting the feedback control of the VN 38 (time t1 in FIG. 2), because of the expectation of the reduction in the electromotive assist force to obtain the similar effect.

When the feedback control is started with VN opening degree that is set assuming an assist power before the reduction and the electromotive assist force shrinks at the same time as the start, the supercharger revolution number Nt necessarily drops. In contrast, when the feedback control is started with the VN opening degree corrected to the closing side, decrease in the electromotive assist force can be supplemented by the increase in the turbine torque, whereby the drop of the supercharger revolution number Nt can be prevented from occurring. Because of this, it is decided in the system of the present embodiment to correct the opening degree of the VN at the start time of the feedback control, as described above.

Concrete Procedure In Fifth Embodiment

FIG. 7 is a flowchart of a routine to realize the above described function. The routine shown in FIG. 7 is identical with the routine shown in FIG. 3 (first embodiment) except that step 150 is inserted between step 110 and step 112. As regards the steps that are common in the both, their description is omitted or abridged with the same reference numerals assigned, hereinafter.

In the routine shown in FIG. 7, a VN base map value that is used as the base of the feedback control amount of the VN 38 is corrected to the closing side, when it is recognized that the condition to stop the assist is formed in step 110 (step 150). Then, it the subsequent step 112, the feedback control of the VN 38 is started with the open control of the electric motor 28.

According to the above described processing, it is possible to e the opening degree of the VN 38 to the closing side at the same time as the assist force by the electric motor 28 decreases. As a result, the drop of the supercharger revolution number Nt due to the reduction of the electric assist power can be evaded according to the processing. Accordingly, it is possible to raise the revolution of the supercharger 22 smoothly also by the system of the present embodiment like the fourth embodiment.

Although it is decided to make the electric motor 28 generate the complement torque after the feedback control of the VN 38 is started in the above described fifth embodiment, like the first to the fourth embodiments, the generation of the complement torque may be omitted. That is, an alternative may be possible in which the feedback control of the electric motor 28 is continued until the exhaust energy increases to the extent by which the target supercharger revolution number Nt0 can be held with the compensation of the VN 38 to the closing side, then the assist of the electric motor 28 is stopped immediately while continuing the feedback control with the compensation of the VN 38 to the closing side.

The invention claimed is:

1. A supercharging control system of an internal combustion engine comprising:
   a supercharger supercharging intake air using exhaust energy of the internal combustion engine;
   an electric motor assisting the revolution of the supercharger;
   a drive ratio variable mechanism changing a ratio of exhaust energy converted into the revolution of the supercharger;
   means for detecting that a status value of said supercharger increases up to a target value corresponding to a target supercharging status or vicinity thereof;
   assist control means for controlling said electric motor for the purpose of realizing the target supercharging status, while controlling said drive ratio variable mechanism with a predetermined pattern until a switching time point when the status value of said supercharger increases up to the target value corresponding to said target supercharging status or vicinity thereof;
   complement control means for controlling said electric motor for the purpose of generating a necessary complement torque to implement said target supercharging status or holding the revolution of said supercharger while controlling said drive ratio variable mechanism for the purpose of implementing said target supercharging status during a predetermined period after said switching time point; and
   non-assist control means for controlling said drive ratio variable mechanism for the purpose of realizing said target supercharging status while stopping power supply to said electric motor after a time point when the exhaust energy reaches a value by which said target supercharging status can be implemented without the assist of said electric motor, wherein
   said complement control means includes means for reducing a command supplied to said electric motor with a predetermined pattern so that the assist force generated by the electric motor becomes zero at the end time point of said predetermined period.

2. The supercharging control system according to claim 1, comprising status value detecting means for detecting said status value, wherein
   said assist control means includes means for controlling said electric motor in a feedback manner so that said status value agrees with said target value;
   said complement control means includes means for controlling said drive ratio variable mechanism in a feedback manner so that said status value agrees with said target value, as well as means for controlling said electric motor with a pattern predetermined as one for generating said complement torque; and said non-assist control means includes means for controlling said drive ratio variable mechanism in a feedback manner so that said status value agrees with said target value.

3. The supercharging control system of the internal combustion engine according to claim 1, comprising:

at least one of gas quantity detecting means for detecting a gas quantity flowing through the internal combustion engine and boost pressure climbing speed detecting means for detecting a climbing speed of the boost pressure generated by said supercharger; and assist variables setting means for setting at least one of said switching time point and said predetermined period based on at least one of said gas quantity and said climbing speed.

4. The supercharging control system of the internal combustion engine according to claim 1, comprising:

at least one of gas quantity detecting means for detecting a gas quantity flowing through the internal combustion engine and boost pressure climbing speed detecting means for detecting a climbing speed of the boost pressure generated by said supercharger; and control variable initial value setting means for setting a control variable initial value that is employed when the control of said drive ratio variable mechanism is changed from the control using said predetermined pattern to the control for the purpose of realizing said target supercharging status.

5. The supercharging control system of the internal combustion engine according to claim 1, comprising:

at least one of gas quantity detecting means for detecting a gas quantity flowing through the internal combustion engine and boost pressure climbing speed detecting means for detecting a climbing speed of the boost pressure generated by said supercharger; and control manner switching means for prohibiting the control by the complement control means and starting the control by the non-assist control means immediate after said switching time point in a case where the gas quantity at said switching time point exceeds a judgment value or in a case where the climbing speed of the boost pressure exceeds a judging value.

6. The supercharging control system of the internal combustion engine according to claim 1, wherein said switching time point is judged to be arrived at a time point when either the gas quantity flowing through the internal combustion engine or climbing speed of the boost pressure exceeds a minimum required amount; and said minimum required amount is the minimum amount of the said gas quantity or said climbing speed required to be achieved at the switching time point in order to generate an exhaust energy enough for realizing said target supercharging status without the assist by the electric motor at the end time point of the control by said complement control means.

7. A supercharging control system of an internal combustion engine comprising:

a supercharger for supercharging intake air by using exhaust energy;

an electric motor for assisting the supercharger to rotate;

a drive ratio variable mechanism for changing a ratio of the exhaust energy converted into the rotation of the supercharger;

assist control means for controlling said electric motor for the purpose of realizing a target supercharging status, while controlling said drive ratio variable mechanism with a predetermined pattern until a switching time point when a status value of said supercharger increases up to a target value corresponding to said target supercharging status or vicinity thereof;

non-assist control means for controlling said drive ratio variable mechanism for the purpose of realizing said target supercharging status while stopping power supply to said electric motor after said switching time point;

at least one of gas quantity detecting means for detecting a gas quantity flowing through the internal combustion engine and boost pressure climbing speed detecting means for detecting a climbing speed of the boost pressure generated by said supercharger; and control variable initial value setting means for setting a control variable initial value that is employed when the control of said drive ratio variable mechanism is changed from the control using said predetermined pattern to the control for the purpose of realizing said target supercharging status.

8. A supercharging control system of an internal combustion engine comprising:

a supercharger supercharging intake air using exhaust energy of the internal combustion engine;

an electric motor assisting the revolution of the supercharger;

a drive ratio variable mechanism changing a ratio of exhaust energy converted into the revolution of the supercharger;

a unit that detects that a status value of said supercharger increases up to a target value corresponding to a target supercharging status or vicinity thereof;

an assist control unit that controls said electric motor for the purpose of realizing the target supercharging status, while controlling said drive ratio variable mechanism with a predetermined pattern until a switching time point when the status value of said supercharger increases up to the target value corresponding to said target supercharging status or vicinity thereof;

a complement control unit that controls said electric motor for the purpose of generating a necessary complement torque to implement said target supercharging status or holding the revolution of said supercharger while controlling said drive ratio variable mechanism for the purpose of implementing said target supercharging status during a predetermined period after said switching time point; and a non-assist control unit that controls said drive ratio variable mechanism for the purpose of realizing said target supercharging status while stopping power supply to said electric motor after a time point when the exhaust energy reaches a value by which said target supercharging status can be implemented without the assist of said electric motor, wherein said complement control unit includes a unit that reduces a command supplied to said electric motor with a predetermined pattern so that the assist force generated by the electric motor becomes zero at the end time point of said predetermined period.

9. The supercharging control system according to claim 8, comprising a status value detecting unit that detects said status value, wherein said assist control unit includes a unit that controls said electric motor in a feedback manner so that said status value agrees with said target value;

said complement control unit includes a unit that controls said drive ratio variable mechanism in a feedback manner so that said status value agrees with said target value, as well as a unit that controls said electric motor with a pattern predetermined as one for generating said complement torque; and said non-assist control unit includes a unit that controls said drive ratio variable mechanism in a feedback manner so that said status value agrees with said target value.

10. The supercharging control system of the internal combustion engine according to claim 8, comprising:

at least one of a gas quantity detecting unit that detects a gas quantity flowing through the internal combustion engine and a boost pressure climbing speed detecting unit that detects a climbing speed of the boost pressure generated by said supercharger; and an assist variables setting unit that sets at least one of said switching time point and said predetermined period based on at least one of said gas quantity and said climbing speed.

11. The supercharging control system of the internal combustion engine according to claim 8, comprising:

at least one of a gas quantity detecting unit that detects a gas quantity flowing through the internal combustion engine and a boost pressure climbing speed detecting unit that detects a climbing speed of the boost pressure generated by said supercharger; and a control variable initial value setting unit that sets a control variable initial value that is employed when the control of said drive ratio variable mechanism is changed from the control using said predetermined pattern to the control for the purpose of realizing said target supercharging status.

12. The supercharging control system of the internal combustion engine according to claim 8, comprising:

at least one of a gas quantity detecting unit that detects a gas quantity flowing through the internal combustion engine and a boost pressure climbing speed detecting unit that detects a climbing speed of the boost pressure generated by said supercharger; and a control manner switching unit that prohibits the control by the complement control unit and starting the control by the non-assist control unit immediate after said switching time point in a case where the gas quantity at said switching time point exceeds a judgment value or in a case where the climbing speed of the boost pressure exceeds a judging value.

13. The supercharging control system of the internal combustion engine according to claim 8, wherein said switching time point is judged to be arrived at a time point when either the gas quantity flowing through the internal combustion engine or climbing speed of the boost pressure exceeds a minimum required amount; and said minimum required amount is the minimum amount of the said gas quantity or said climbing speed required to be achieved at the switching time point in order to generate an exhaust energy enough for realizing said target supercharging status without the assist by the electric motor at the end time point of the control by said complement control unit.

14. A supercharging control system of an internal combustion engine comprising:

a supercharger that supercharges intake air by using exhaust energy;

an electric motor that assists the supercharger to rotate;

a drive ratio variable mechanism that charges a ratio of the exhaust energy converted into the rotation of the supercharger;

an assist control unit that controls said electric motor for the purpose of realizing a target supercharging status, while controlling said drive ratio variable mechanism with a predetermined pattern until a switching time point when a status value of said supercharger increases up to a target value corresponding to said target supercharging status or vicinity thereof;

a non-assist control unit that controls said drive ratio variable mechanism for the purpose of realizing said target supercharging status while stopping power supply to said electric motor after said switching time point;

at least one of a gas quantity detecting unit that detects a gas quantity flowing through the internal combustion engine and a boost pressure climbing speed detecting unit that detects a climbing speed of the boost pressure generated by said supercharger; and a control variable initial value setting unit that sets a control variable initial value that is employed when the control of said drive ratio variable mechanism is changed from the control using said predetermined pattern to the control for the purpose of realizing said target supercharging status.

* * * * *